May 28, 1929.  M. J. TRUMBLE  1,714,963
PROCESS OF PRODUCING GASOLINE FROM SOLID MATERIAL
Filed June 25, 1924  5 Sheets-Sheet 1

INVENTOR:
MILON J. TRUMBLE,
BY
Graham + Hunn
ATTORNEYS.

May 28, 1929.　　M. J. TRUMBLE　　1,714,963
PROCESS OF PRODUCING GASOLINE FROM SOLID MATERIAL
Filed June 25, 1924　　5 Sheets-Sheet 2
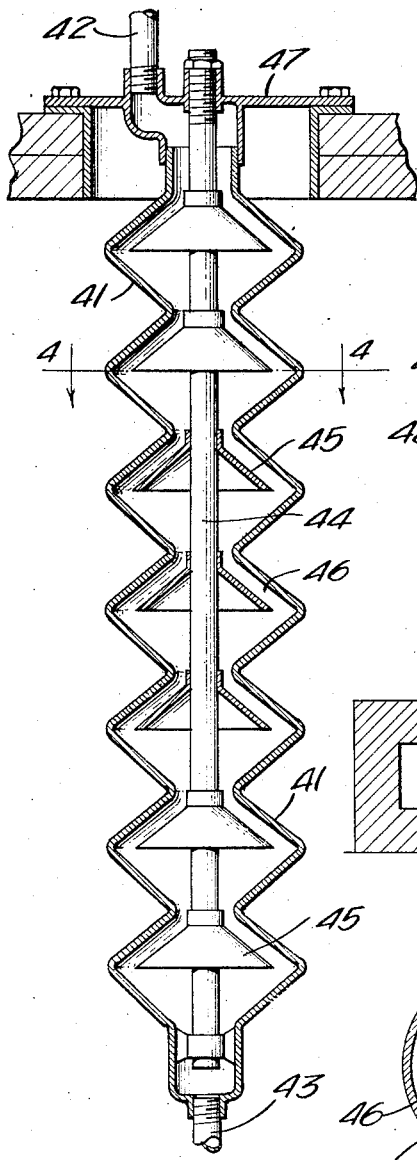
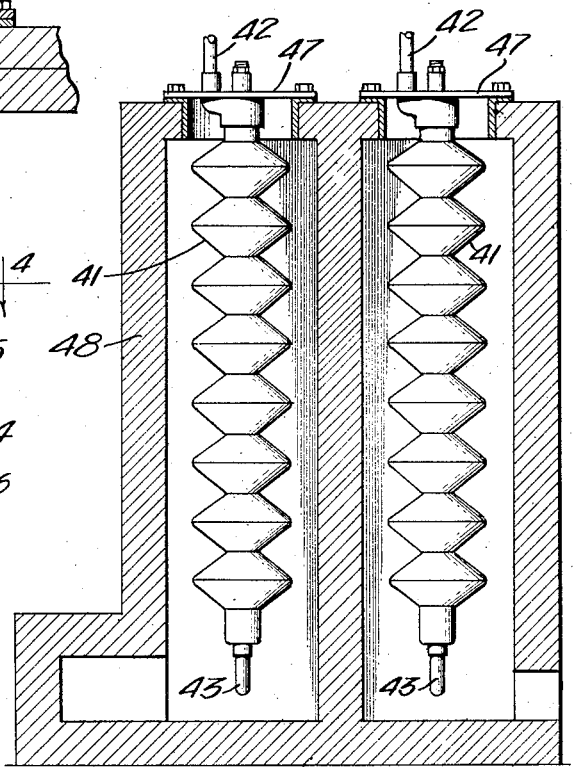
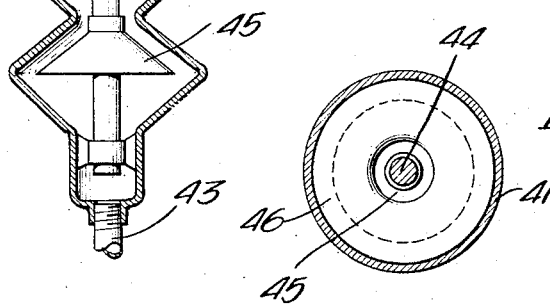
INVENTOR:
MILON J. TRUMBLE,
BY
Graham + Lewis
ATTORNEYS.

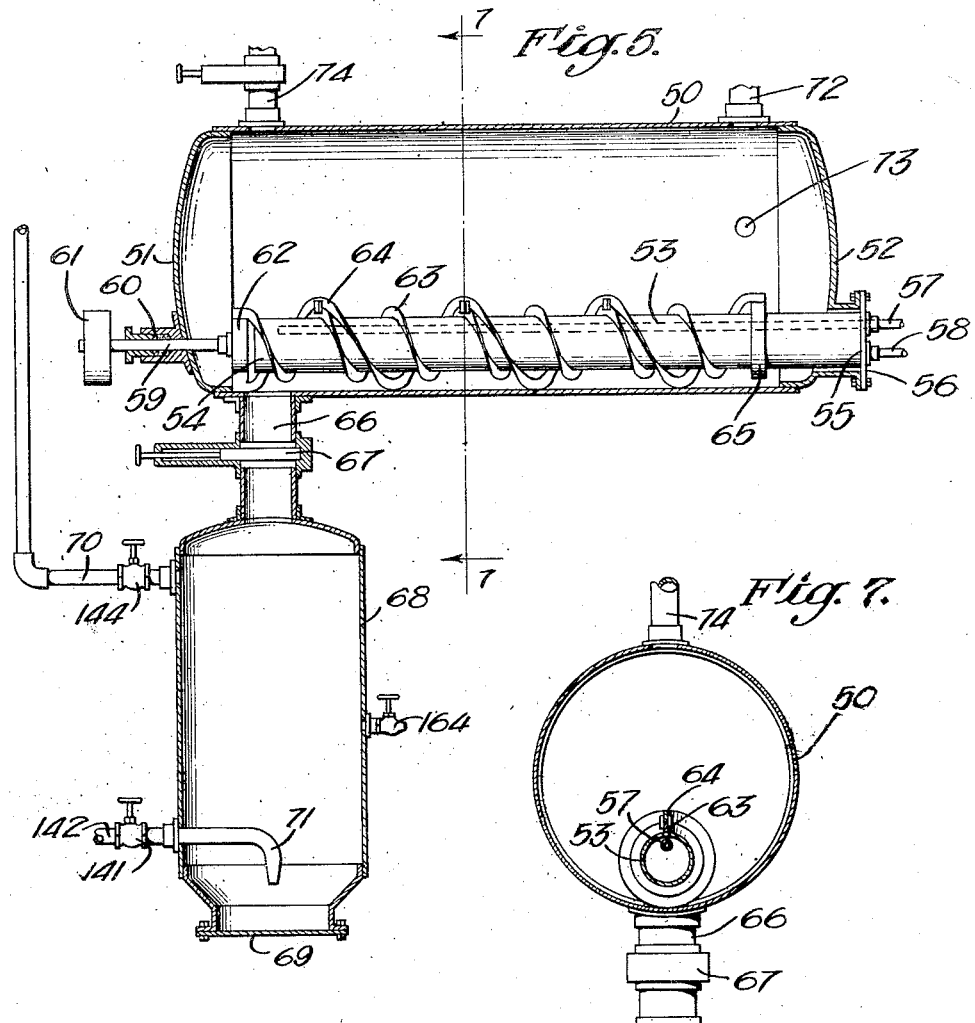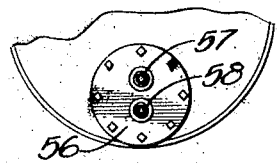

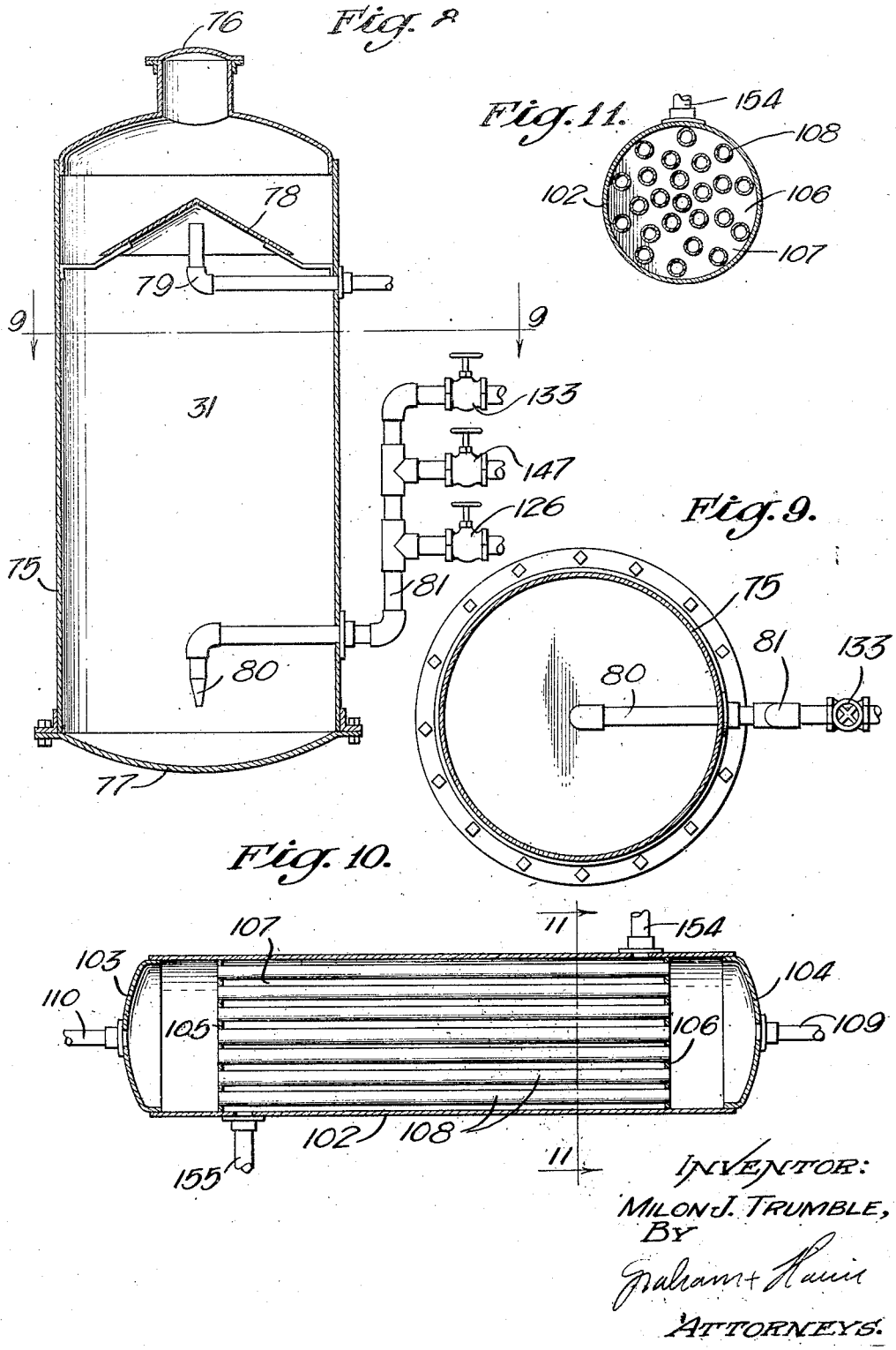

May 28, 1929. M. J. TRUMBLE 1,714,963
PROCESS OF PRODUCING GASOLINE FROM SOLID MATERIAL
Filed June 25, 1924  5 Sheets-Sheet 5
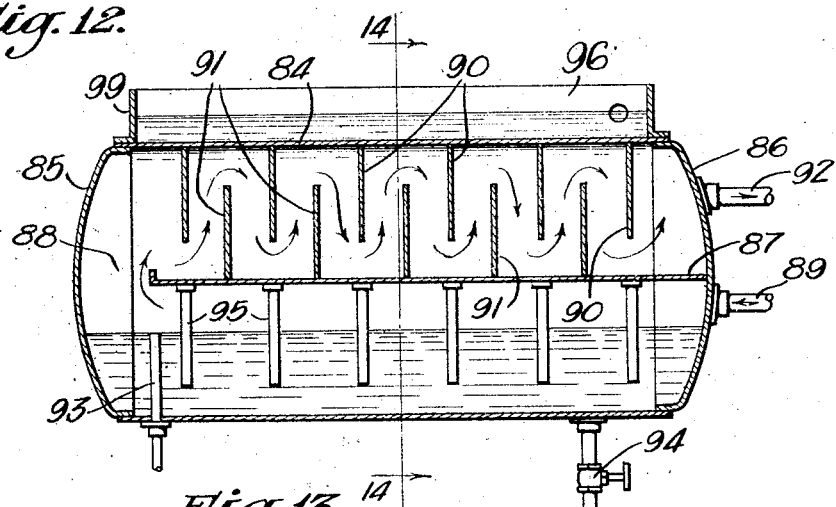
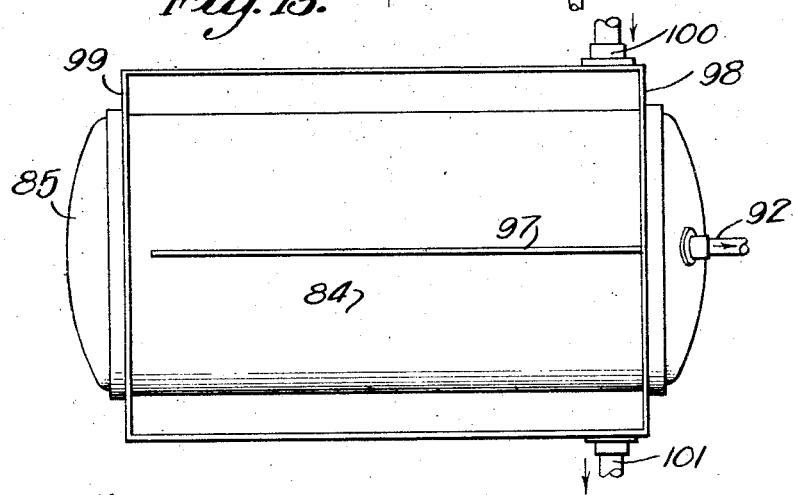
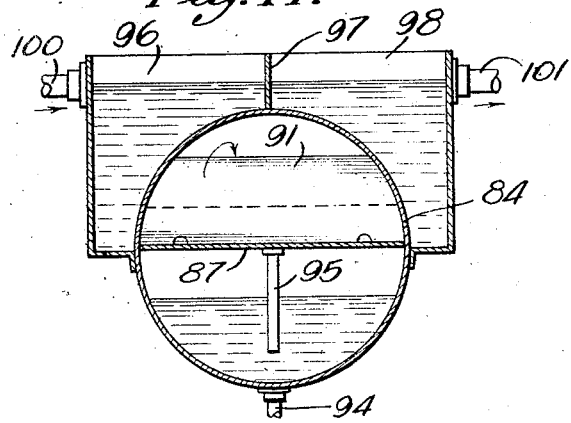
INVENTOR:
MILON J. TRUMBLE,
BY
Graham + Harris
ATTORNEYS.

Patented May 28, 1929.

1,714,963

UNITED STATES PATENT OFFICE.

MILON J. TRUMBLE, OF LOS ANGELES, CALIFORNIA.

PROCESS OF PRODUCING GASOLINE FROM SOLID MATERIAL.

Application filed June 25, 1924. Serial No. 722,263.

My invention relates to the utilization of solid material such, for example, as coal, lignite, or shale, which is capable, when heated, of producing hydrocarbon vapors.

It is an object of the invention to provide means for producing from such material a highly volatile hydrocarbon, such as gasoline, and certain volatile by-products.

It is a further object to provide means for producing such hydrocarbon and by-products with a very high degree of economy, and with apparatus which is low in first cost and easily maintained.

It is a further object of my invention to provide means by which coal or lignite can be treated to produce gasoline or other desirable hydrocarbons leaving as a residue a high grade smokeless fuel.

It is a further object to provide means by which lignite, brown coal, or waste material from other processes may be so treated, thus utilizing a very cheap material and producing therefrom a valuable volatile hydrocarbon and a valuable smokeless fuel.

It is a well known fact that many such materials give off hydrocarbon vapors when heated but previous attempts to utilize such materials have been commercially unsuccessful due to the high cost of operation and the low value of the products obtained. My invention greatly reduces the cost of operation and produces materials which are in great demand at a high price.

My invention contemplates the cracking of oil in a still in close contact with free carbon. This free carbon acts as a catalyzer to promote the cracking reaction.

In the following specification I shall describe my invention as applied to the treatment of "coal", intending to include under this term all solid materials such as lignite, coal, shale or the like, which are capable of giving off hydrocarbon vapors when heated. I shall also describe the invention as applied to the production of "gasoline", although I do not wish to be understood as limiting myself thereto, since the invention can be applied to the production of a wide variety of hydrocarbon liquids.

In the drawings, which are for illustrative purposes only,

Fig. 2 is a section through the center of one of the superheaters used in said plant.

Fig. 3 is a section through a portion of the superheater furnace showing the method of mounting the superheaters therein.

Fig. 4 is a section on a plane indicated by the line 4—4 of Fig. 2.

Fig. 5 is a section through one of the stills used in said plant.

Fig. 6 is an end view of a portion of said still.

Fig. 7 is a section on a plane indicated by the line 7—7 of Fig. 5.

Fig. 8 is a section through one of the retorts used in said plant.

Fig. 9 is a section on a plane indicated by the line 9—9 of Fig. 8.

Fig. 10 is a section through the condenser used in said plant.

Fig. 11 is a section on a plane indicated by the line 11—11 of Fig. 10.

Fig. 12 is a section through one of the dephlegmators used in said plant.

Fig. 13 is a plan view of the same.

Fig. 14 is a section on a plane indicated by the line 14—14 of Fig. 12.

Figure 1:
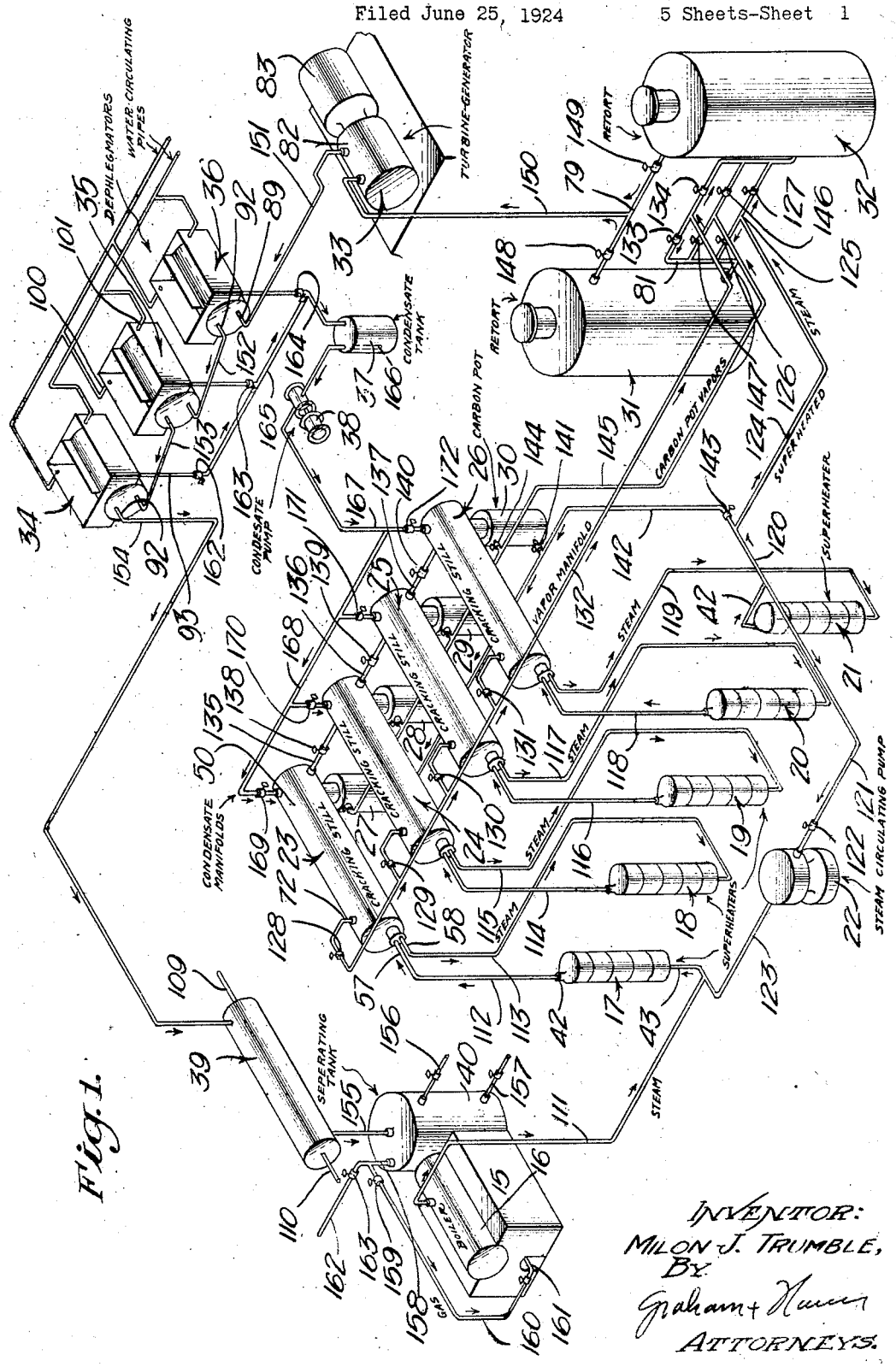
Fig. 1 is a diagrammatic view of a plant adapted to carry on my invention.

In the plant illustrated in the drawings, which is merely one convenient embodiment of many possible embodiments of my invention, I use certain principal pieces of apparatus as follows: a furnace 15 for a boiler 16; superheaters 17, 18, 19, 20 and 21; a steam circulating pump 22; stills 23, 24, 25 and 26, each with its carbon pot which are numbered 27, 28, 29 and 30; a pair of retorts 31 and 32; a power plant 33; three dephlegmators 34, 35 and 36; a condensate tank 37; a condensate pump 38; a condenser 39; and a separating tank 40.

These individual pieces of apparatus are constructed as follows: The furnace 15 and the boiler 16 are of any convenient form such as are well known in the art of steam generation and their details of construction need not be described here. The boiler should preferably be capable of delivering steam at a pressure of about two hundred pounds per square inch, and may be conveniently fired by means of gas produced in the plant as will hereinafter be explained.

The superheaters shown in Figs. 2, 3 and 4 are merely convenient forms of producing a high superheat on the steam delivered by the boiler 16. Each of them consists of a tight cast shell 41 having an outlet 42 at its upper end an inlet 43 at the bottom. A central rod 44 extends downwardly through the center of the superheater and carries flanges 45 which extend into the convolutions 46 of the shell 41. The superheaters may be suspended by flanges 47 in a superheater furnace 48, not shown in Fig. 1, the furnace 48 being fired with any convenient fuel so that the steam is superheated therein to from 1000 degrees Fahrenheit to 1500 degrees Fahrenheit. Other forms of superheater can be used if desired.

The stills shown in Figs. 5, 6 and 7 are of special design and are well suited to my purpose. They consist of a tight shell 50 having heads 51 and 52 at either end thereof. Secured in the head 52 is a pipe 53 which has an inner closed end 54 and which is closed at its end 55 outside the still by a plate 56. An inlet pipe 57 projects into the pipe 53 to a point near its end 54 and an outlet pipe 58 connects into the lower part of the pipe 53. A shaft 59 projects through the head 51 and has a stuffing box 60 therearound. This shaft 59 may be driven by means of a pulley or gear 61 from any convenient source of power, not shown, the shaft being rotated at a speed of about twenty revolutions per minute or slower. Mounted on the inner end of the shaft 59 is a plate 62, to which are attached two spiral scrapers 63 and 64, the other ends of these scrapers being attached to a ring 65 which turns freely on the pipe 53. The inner scraper 63 is in contact with the outer surface of the pipe 53 and serves to scrape carbon deposits off the outer surface of this pipe and the outer scraper 64 just clears the inner wall of the shell 50 and serves to force the carbon that accumulates in the still towards an opening 66 leading downwardly into a carbon pot 68 through a valve 67. The lower end of the carbon pot 68 has a flanged opening closed by a cover 69, and the carbon pot has a steam inlet pipe 71 and a vapor outlet pipe 70. The shell 50 is provided with a vapor outlet pipe 72, a condensate inlet pipe 74 and a circulating pipe 73.

The retorts 31 and 32 shown in Figs. 8 and 9 each consist of a tight shell 75 having a top provided with an inlet opening closed by a cover 76. Detachably secured to the bottom of the shell is a cover 77. Supported in the top of the shell is an imperforate cone 78 which protects the upper end of a vapor outlet pipe 79, which extends through the side of the shell. Projecting downwardly inside the shell is an inlet nozzle 80 which passes through the side of the shell and is connected to an inlet manifold 81.

The power plant 33 is standard apparatus and no special illustration thereof is necessary. It preferably consists of a steam turbine 82 directly connected to a turbo-electric generator 83.

The dephlegmators 34, 35 and 36 are illustrated in Figs. 12, 13 and 14, and while any standard form of dephlegmator may be used, that illustrated has a peculiar utility in connection with my invention.

Each of the dephlegmators 34, 35 and 36 consists of a shell 84 having tight ends 85 and 86. Extending longitudinally inside the shell and tightly secured to the walls thereof and secured to the end 86 is a partition 87, this partition stopping a little short of the end 85 and leaving a space 88 at the end thereof through which vapors may rise. Vapors are delivered to the interior of the shell 84 through an inlet pipe 89, flowing longitudinally to the left, as shown in Fig. 12, below the partion 87. Secured to the upper surface of the shell and projecting downwardly therefrom are a series of baffles 90. Between each pair of baffles 90 there is an upwardly extending baffle 91, which is welded to the partition 87. The baffles 90 and 91 provide a tortuous channel around which the vapors pass from left to right, as shown in Fig. 12, to the outlet pipe 92. Some fluid is maintained in the bottom of the dephlegmator due to the fact that a liquid outlet pipe 93 is connected through the bottom of the shell 84 and extends upwardly therein, as shown. A sludge pipe 94, through which any hot deposits settling in the shell can be withdrawn, is connected at the extreme bottom of the shell. For the purpose of withdrawing any condensate from the spaces between the baffles 91, pipes 95 are provided, these pipes being secured to the partition 87 and opening into the space above the partition 87, the lower end extending down to a point very close to the bottom of the shell 84. In some cases it is desirable to provide a rectangular water box 96 which is mounted on top of the dephlegmator, as shown, this box having a central partition 97 secured to one end 98 of the box and terminating just short of the other end 99 thereof. Water is admitted to the box through a pipe 100 and is withdrawn therefrom through a pipe 101. In some cases it is not necessary to provide water-cooled dephlegmators and the ordinary air-cooled type may be substituted.

The tank 37 and the pump 38 are standard types of apparatus, diagrammatically illustrated in Fig. 1 and in regard to which no special explanation is necessary.

The condenser 39 is also of standard construction but is illustrated in Figs. 10 and 11. This condenser consists of a shell 102 having ends 103 and 104. Secured to the shell 102, inside the ends 103 and 104, are false heads 105 and 106, the space between these heads constituting an oil space 107. Tubes 108 are secured in the heads 105 and 106 and pass through the oil space 107. Cooling water is supplied to one end of the condenser through a pipe 109, this water passing through the tubes 108 and being withdrawn through a water outlet pipe 110.

The tank 40 is also of standard construction and needs no special explanation.

The method of connection of the various apparatus is as follows:

The boiler 16 is provided with a steam outlet pipe 111 which is connected to the inlet pipe 43 of the first superheater 17, the outlet pipe 42 of this superheater 17 being connected through a pipe 112 with the inlet pipe 57 of the first still 23. The steam from the inlet pipe 57 is delivered to the right hand end of the tube 53, as shown in Fig. 5, then passing backwardly through the tube 53 and being delivered through the outlet pipe 58 to a pipe 113 which delivers it to the bottom of the second superheater 18. From this superheater it is delivered through a pipe 114 to the inlet pipe 57 of the still 24, being delivered from the outlet pipe 58 of that still to a pipe 115, through which it is conducted to the third superheater 19. From this superheater it is conducted through a pipe 116 to the still 25 and then conducted through a pipe 117 to the superheater 20. From the superheater 20 it is conducted through a pipe 118 to the still 26, and from the still 26 it is conducted through a pipe 119 to the bottom of the superheater 21. The superheater 21 delivers the superheated steam to a pipe 120.

A pipe 121 is also connected to the outlet pipe 42 of the superheater 21, this pipe being provided with a valve 122 and being connected to the inlet side of the pump 22. The pressure side of this pump is connected through a pipe 123 with the inlet end of the superheater 17.

A pipe 124 is connected to the pipe 120 and delivers steam to a bottom connection 125 between the retorts 31 and 32. Valves 126 and 127 are provided, by means of which the bottom connection 125 may be connected to the inlet manifold 81 of either the retort 31 or the retort 32. The outlet pipes 72 of the stills 23, 24, 25 and 26 are connected through valves 128, 129, 130 and 131 with a vapor manifold 132, the vapor manifold connecting through valves 133 and 134 with the inlet manifolds 81 of the retorts 31 and 32. The stills 23, 24, 25 and 26 are connected in a single series by means of pipes 135, 136 and 137, these pipes having valves 138, 139 and 140 respectively. The steam inlet pipes 71 of the carbon pots 27, 28, 29 and 30 are all connected through suitable valves 141 with a steam inlet pipe 142, which is provided with a valve 143 and which connects to the pipe 120 which is supplied with superheated steam from the last of the superheaters 21. The outlet pipes 70 of the carbon pots 27, 28, 29 and 30 are each connected through a valve 144 with an outlet manifold 145, this outlet manifold pipe 145 connecting through valves 146 and 147 with the inlet manifolds 81 of the retorts 31 and 32.

The outlet pipes 79 of the retorts 31 and 32 are connected through valves 148 and 149 with a pipe 150, which is connected into the pressure side of the turbine 82. The low pressure side of the turbine 82 is connected through a pipe 151 with the inlet pipe 89 of the first separator 36, the vapor outlet pipe 92 of this separator being connected through a pipe 152 with the vapor inlet pipe 89 of the second separator 35, the vapor outlet 92 of the second separator being connected through a pipe 153 with the vapor inlet 89 of the third separator 34. The vapor outlet pipe 92 of the third separator is connected through a pipe 154 to the space 107 between the heads 105 and 106 of the condenser 39. A pipe 155 is connected into the bottom of this space and is connected into the top of the tank 40. This tank is provided with an oil outlet pipe 156, a water outlet pipe 157, and a gas outlet pipe 158. The gas outlet pipe 158 is connected through a valve 159 and a pipe 160 with a gas burner 161 in the furnace 15 under the boiler 16. This gas may also be withdrawn for other purposes through a pipe 162 having a valve 163.

The liquid outlet pipes 93 of the dephlegmators 34, 35 and 36 are connected through valves 162, 163 and 164 with a manifold 165 which discharges into the tank 37. A pipe 166 extends into the bottom of the tank 37 and is connected to the suction side of the pump 38, this pump delivering condensate under pressure through a pipe 167 to a manifold 168. From the manifold 168 this condensate may be delivered through valves 169, 170, 171 or 172 to any of the stills 23, 24, 25 or 26.

The method of operation of the invention is as follows:

The process being a continuous one, the stills 23, 24, 25 and 26 are kept partially full of condensate at all times, this condensate being supplied automatically during the operation of the plant. The retorts 31 and 32 are charged with a solid material which it is desired to treat. This solid material may be coal, lignite, shale or any other material which will produce hydrocarbon vapor by the application of heat. The steam from the boiler 16 passes successively through the superheater 17, the still 23, the superheater 18, the still 24, the superheater 19, the still 25, the superheater 20 and the still 26. In its passage through the stills it acts upon the contents thereof through the walls of the pipes 53, causing a vaporization of the contents of the still. The exact action of the still will be discussed hereinafter.

After leaving the last of the stills 26 the steam is again superheated in the superheater 21 and passes through the pipes 120 and 124 to the intake manifold 81 of one of the retorts 31 or 32. This steam is then delivered through the inlet 80 into the bottom of the charge of material in the retort, passing upwardly therethrough and causing a distillation of the products thereof. The vapors produced in the stills 23, 24, 25 and 26 are also delivered through the vapor manifold 132 into the intake manifold 81 of one of the retorts 31 or 32. The vapors produced in the stills 23, 24, 25 or 26 may for convenience be termed "primary" vapors, the vapors produced by distillation in the retorts 31 and 32 being termed "secondary" vapors. These secondary vapors contain some steam and primary vapors from the stills. This mixture which is termed the secondary vapor is delivered from the retorts 31 and 32 to the prime mover 82, being utilized in the turbine 82 to produce electrical power which is a by-product, or in some cases may be the principal product of the apparatus. The stills 23, 24, 25 and 26 and the retorts 31 and 32 are preferably maintained at a pressure of about 200 pounds per square inch. Higher pressures are desirable but require more expensive apparatus. The question of the pressure to be used is purely an economic one and need not concern us here.

In the turbine 82 this pressure is preferably reduced to a little above atmospheric pressure and the vapors at this reduced pressure pass through the pipe 151 into the first dephlegmator 36. In its passage successively through the dephlegmators 36, 35 and 34 the vapor is cooled by contact with the water-cooled walls of the shells 84 and condensed, being delivered through the pipes 93 and the pipe 165 in the form of a condensate into the tank 37. This condensate is a liquid hydrocarbon having a higher boiling point than the desired product. If the desired product is gasoline, this condensate is a less volatile and, at the present time, a less valuable liquid than the desired gasoline. The desired product is carried through the pipe 154 and is condensed in the condenser 39, together with the water resulting from the steam. This water is withdrawn from the separator 40 through the pipe 157, gasoline being withdrawn through the pipe 156.

In the operation of the process a certain amount of non-condensible gas is produced, and this gas is delivered through the pipe 158 to the burner 161, or may be used for heating the superheaters or for other purposes. The heavy condensate in the tank 37 is drawn up by the pump 38 through the pipe 166 and is forced under pressure through the pipe 167 into the stills 23, 24, 25 and 26. The temperature of the steam delivered into the pipes 53 of the stills is sufficient to crack the condensates in the still. This steam may be at a temperature in excess of 1500 degrees Fahrenheit and should preferably be at least 1000 degrees Fahrenheit. The temperature necessary to crack the contents of the stills 23, 24, 25 and 26 varies with the material being treated and the character of the product desired. This temperature should probably never be less than 700 degrees Fahrenheit and it will generally be necessary to run the temperature above 850 degrees Fahrenheit. The cracking of hydrocarbon oil is now a well known phenomenon and the temperature and pressures necessary for cracking are well understood.

In the stills 23, 24, 25 and 26 a molecular decomposition of the oil takes place, producing primary vapor which contains fractions having a boiling point considerably below the boiling point of the condensate being cracked. This primary vapor is passed back into the material being treated in the retorts 31 and 32, and used as a distilling agent therein.

Coincident with the production of the primary vapor in the stills 23, 24, 25 and 26, carbon is produced in the stills, this carbon being a troublesome factor in all other cracking processes. By providing the scraping devices 63 and 64 which are kept in constant operation, I am able to prevent the adhesion of carbon to the outside of the heating tubes 53, the scraping devices constantly cleaning the carbon off the outside of these tubes and forcing it from right to left in the still as shown in Fig. 5. The valve 67 is ordinarily left open and the valves 141 and 144 of the carbon pots 68 are ordinarily closed. The carbon which is forced towards the end 51 of the still therefore falls through the opening 66 into the carbon pot and accumulates therein. At periodic intervals the valve 67 is closed, the valves 141 and 144 being opened. The valve 143 is then also opened and superheated steam is taken from the pipe 120 through the pipe 142, being delivered through the inlet pipe 71 into the carbon in the carbon pot 68. Due to the high temperature of this steam all condensates or other volatile matter in the carbon are carried off through the valve 144 and the pipe 145, being delivered through the inlet manifold 81 into one of the retorts 31 and 32. Steam is allowed to blow through the carbon in the carbon pot 68 for a short time, the valves 141 and 144 then being closed. Pressure in the carbon pot may then be relieved through a petcock 164, the plate 69 closing the bottom of the carbon pot being removed. The material in the carbon pot will then consist of a carbon which has various important industrial uses. As soon as the carbon pot is empty, the plate 69 is replaced and the valve 67 is again opened to allow the carbon in the still to again be delivered into the carbon pot. In the practical operation of the plant the stills 23, 24, 25 and 26 operate continuously over long periods, the carbon content being constantly removed by the use of the carbon pot.

The retorts 31 and 32 are alternately charged and discharged. In the initial treatment of a charge in the retorts 31 and 32 the primary vapors from the vapor manifold 132 are ordinarily sufficient to produce a perfect distillation, the secondary vapors produced therefrom in the retorts 31 and 32 containing all of the low volatiles ordinarily in the raw material. As soon as these low boiling point volatiles have been removed from the hot residue, superheated steam is delivered through the pipe 124 into the charge in the retort and the contents thereof are distilled to dryness.

In the case of a solid material like coal or lignite, which contains relatively little ash, there results a material which forms a high grade domestic fuel. Where the plant is operated upon shale the residue left in the retort after it is treated with superheated steam consists almost wholly of mineral matter mixed with some carbon.

In the operation of the plant it is often desirable to operate the pump 22, opening the valve 122 and circulating superheated steam from the top of the last superheater 21 to the bottom of the first superheater 17. When so operated the superheaters 17, 18, 19, 20 and 21 supply substantially all of the heat used in the stills 23, 24, 25 and 26 and there is no loss of latent heat therein. When so operated, the boiler 16 is only called on to supply additional steam to the closed cycle made up of the retorts and the superheaters, in the event that steam is drawn off from this closed path for the purpose of blowing out the carbon pots or for supplying heat to the retorts.

In operating on certain types of material very little steam is required for blowing out the carbon pots or for treating the charge in the retorts. When operating on this material, the boiler supplies only a very small amount of steam and the main heating is done by the superheaters, the superheated steam being circulated continuously by means of the pump 22. This produces a very high economy of steam, since there is no loss of latent heat in the stills. The steam which is used in the carbon pots and the primary and secondary vapors produced in the process, together with the steam used for finally blowing out the retorts, is all conserved and delivered through the pipe 150 to the steam turbine 82. In the steam turbine the energy contained in the primary vapors is very largely utilized to produce electric power.

I attach great importance to my novel method of cracking in the stills 23, 24, 25 and 26. Free carbon is produced in large quantities in these stills, due to the cracking of the oil, and this carbon is mixed with the liquid content by the members 63 and 64 so that it is in very intimate contact with the liquid at all times. I have found that carbon in a finely divided condition will very greatly promote the cracking action, acting in a measure as a catalyzer. This carbon gradually agglomerates in the still and the larger masses settle to the bottom of the still and are forced into the carbon pots 68. The finely divided carbon stays in suspension in the oil.

I claim as my invention:

A process for treating solid bituminous material for the extraction of volatiles which comprises: subjecting a condensate from the distillation of solid bituminous material to a cracking process in a cracking still; recovering hot carbon resulting from said cracking process in a receptacle separate from said cracking still; passing superheated steam and hot vapors coming from said cracking process and said carbon receptacle respectively through body of solid bituminous material for distilling volatiles from said bituminous material; dephlegmating the vapors resulting from said distillation; delivering the condensate resulting from said dephlegmation to said cracking process; and subjecting the uncondensed vapors resulting from said dephlegmation to a condensing process.

In testimony whereof, I have hereunto set my hand at Los Angeles, California, this 18th day of June, 1924.

MILON J. TRUMBLE.